United States Patent
DiPaola et al.

(10) Patent No.: US 7,939,772 B2
(45) Date of Patent: May 10, 2011

(54) ELECTRICAL SWITCH SYSTEM FOR USE WITH VEHICULAR TRANSMISSIONS

(75) Inventors: David J. DiPaola, Norwood, MA (US); George P. Krajewski, Coventry, RI (US); Bonnie L. Moore, Attleboro, MA (US); Denis J. Villiard, Mansfield, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 441 days.

(21) Appl. No.: 12/228,988

(22) Filed: Aug. 19, 2008

(65) Prior Publication Data

US 2009/0107811 A1    Apr. 30, 2009

Related U.S. Application Data

(60) Provisional application No. 61/001,223, filed on Oct. 31, 2007.

(51) Int. Cl.
*H01H 13/16* (2006.01)
(52) U.S. Cl. .................................................. 200/61.91
(58) Field of Classification Search ............... 200/61.88, 200/61.91, 252
See application file for complete search history.

(56) References Cited

U.S. PATENT DOCUMENTS

| | | | |
|---|---|---|---|
| 5,440,087 A | 8/1995 | Cobb, III | |
| 5,525,768 A | 6/1996 | Cobb, III et al. | |
| 5,875,884 A * | 3/1999 | Tomotoshi | 200/252 |
| 5,902,975 A | 5/1999 | Coulson et al. | |
| 6,518,525 B1 * | 2/2003 | Anastasia et al. | 200/61.91 |
| 2009/0133995 A1 * | 5/2009 | Nakano et al. | 200/61.91 |

* cited by examiner

*Primary Examiner* — Edwin A. Leon
*Assistant Examiner* — Vanessa Girardi
(74) *Attorney, Agent, or Firm* — Russell E. Baumann

(57) ABSTRACT

A linear vehicle transmission switch (10) has first and second interfitting housing members (12, 14) each having an electrically conductive lead frame (12m) insert molded in electrically insulative material and formed with exposed segments (12f) of lead frame material along linear tracks. An elongated actuator (16) is slidably received in a channel of one of the housing members and is disposed along a side of the tracks. A paddle (16b) extends transversely across the tracks. Ribs are disposed between tracks and dimensioned to limit rotational movement of the paddle. A pair of stabilized contact switches is disposed on the paddle for each track. The housing members have a selected camber to lower the force required to move the actuator. The lead frames are plated to reduce contact resistance and improve wear.

16 Claims, 5 Drawing Sheets ular path. Yet
ELECTRICAL SWITCH SYSTEM FOR USE WITH VEHICULAR TRANSMISSIONS

Benefit is claimed under 35 USC Section 119 (e) (1) of U.S. Provisional Application No. 61/001,223, filed Oct. 31, 2007.

FIELD OF THE INVENTION

This invention relates generally to vehicular transmissions and more particularly to apparatus for sensing the position of the shifter of the automatic transmission of a vehicle thereby indicating the mode of the transmission by means of providing an input to the electronic control module (ECM).

BACKGROUND OF THE INVENTION

It is conventional to provide a switch assembly that changes position based on mechanical linkages connected to the shifter of a transmission of the vehicle to provide an output display signal. Such switch assemblies generally comprise either a rotary movable contact mechanism such as those shown in U.S. Pat. Nos. 5,525,768 and 5,440,087, or a straight linear movable contact mechanism such as shown in U.S. Pat. No. 5,902,975. The present invention relates to the latter type in which an actuator carrying a set of movable contacts is caused to slide back and forth in a straight line. According to the present invention, the shifter changes the position of the internal mode switch and the internal mode switch's electrical bit pattern may trigger a change in electronically controlled valves. According to the latter noted patent, the movable contacts are spring cantilever arms biased into engagement with respective stationary electrically conductive segments along tracks in locations selected to provide a selected pattern so that output signals are obtained based on the longitudinal position of the internal mode switch to identify the switching position of the gear shift selector of the vehicle transmission. According to the present invention the spring contact arms were changed to include dual bends however, testing has shown that over time the contact force of these spring contact arms decrease and eventually become less reliable. For example, if the contact force is insufficient the spring contact arm can lose contact with the stationary conductive segment during periods of high vibration. Another limitation in the system is that over time the contact resistance can increase sufficiently to cause a problem due to oxidation of wear particles and the surface of the mating stainless steel conductive surfaces. The electrical switch system operates by applying a voltage to the stationary conductive segments with one of those segments being grounded. All the spring arms are connected electrically and one particular spring arm and the stationary conductive segment that is grounded are in continual contact. When a grounded spring contact arm makes contact with a stationary conductive segment at high voltage, it grounds that segment causing the voltage to drop below a specific threshold. When the spring contact arm rides on the plastic for that segment, the stationary conductive segment remains at high voltage. Since the spring contact arms and the stationary conductive segments are stainless steel, exposure to oxygen, time and heat cause them to oxidize and the subsequent oxidized wear particles also causing the contact resistance to increase thereby increasing Vout until there is insufficient deferential between the switching level for the electronic module to determine whether or not the spring contact arms are in engagement with a stationary conductive segment.

SUMMARY OF THE INVENTION

It is an object of the invention to provide a vehicular transmission electrical switch system that has an extended expected life expectancy relative to prior art systems. Another object of the invention is the provision of a switch system that has lower contact resistance. Another object of the invention is the provision of such a system that requires less force to move the switch actuator along its operational linear path. Yet another object of the invention is to improve switch functionality during severe vibration.

Briefly, in accordance with the preferred embodiment of the invention, a plurality of parallel extending tracks are provided in each of two mating housing. The tracks are formed by a lead frame having parallel extending strips insert molded in electrically insulating plastic and exposed at selected locations along each track to provide a unique binary electrical input indicative of the particular location of an actuator. The actuator comprises a plurality of leaf springs with a pair of respective leaf springs aligned with each track. The leaf springs are all simultaneously grounded through a grounding trace in the actuator. When electrical contact is made between an exposed conductive segment and a leaf spring, Vout is shorted to ground. When the leaf spring is on plastic Vout is above a voltage threshold because current can not flow.

The actuator comprises an elongated slidable member received in a channel that extends parallel to the tracks on one side of a housing member. The slidable member has an electrically insulative paddle adapted to extend transversely across the several tracks. An electrically conductive sheet of suitable conductive material, such as stainless steel, is disposed about the two face surfaces of the paddle facing the tracks and attached to the paddle. For each track a pair of aligned cantilever contact arms are struck from the sheet, the arms generally extending toward each other but slightly offset from one another so that both arms of a pair are elongated extending away from the surface of the paddle and are engageable with a single strip of the lead frame forming the track.

One of the housing members is provided with a suitable mounting means such as a pair of bored bosses provided with bushings and an electrical harness having electrical wires for connections with the lead frames. One housing member is received on the other housing member and a plurality of clip members are used to pinch the two housing members together.

According to a feature of the invention, a selected camber is provided for each housing member so that the distance between each track of a housing member and its respective aligned track in the other housing member varies along the length of the track with the distance between the tracks at the center of a respective track length being greater than at it is at the extremities of the respective track length. This feature lowers the force required to move the actuator along its path.

The tracks of each housing member are separated from one another by a rib member extending from a base wall of a housing member to a selected height to provide a certain gap between a rib of one housing and a respective aligned rib of the other housing member. According to another feature of the invention, the rib in the housing member containing the actuator channel furthest from the actuator channel extends slightly higher from the base wall than the remaining ribs of the bottom housing member to provide a limit to rotational movement of the actuator paddle about the longitudinal axis of the elongated actuator and thereby provide enhanced vibration insensitivity of the switch system.

According to another feature of the invention, the lead frames are formed of stainless steel and are provided with a bright nickel plating to reduce contact resistance and reduce fretting corrosion and oxidized wear particles.

According to yet another feature of the invention, the cantilever leaf springs arms are formed so that the free distal ends of the arms have a selected free height relative to their fixed end that is greater than the designed operational free height. A force is then applied to the free end of each arm deflecting the free end down to a level of approximately 2 mm above the plane in which the fixed end of the arm lies, and then the force is removed. This cycle is repeated at least once resulting in a stabilized free height of somewhat below the height as formed thereby providing the operational height that maintains a preselected level of contact force that is greatly extended.

DETAILED DESCRIPTION OF THE PREFERRED EMBODIMENT

Figure 1:
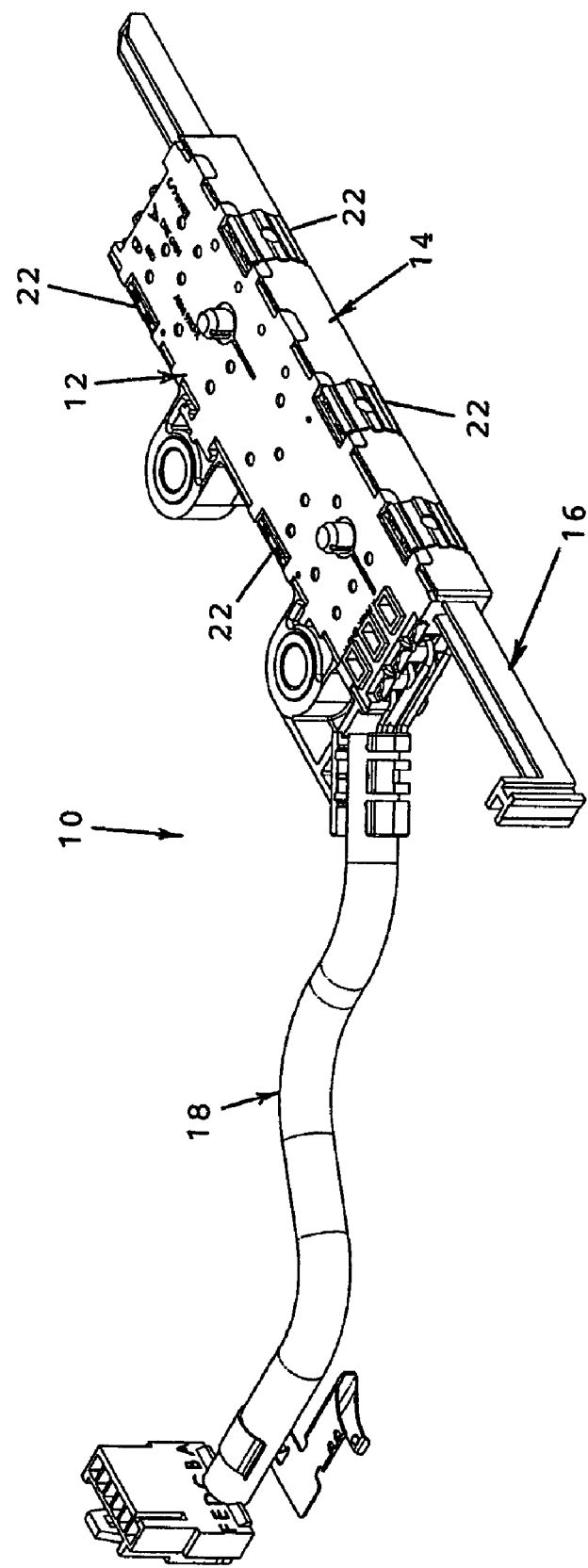
FIG. 1 is a perspective view of an assembled switch system made in accordance the preferred embodiment of the invention.
Figure 2:
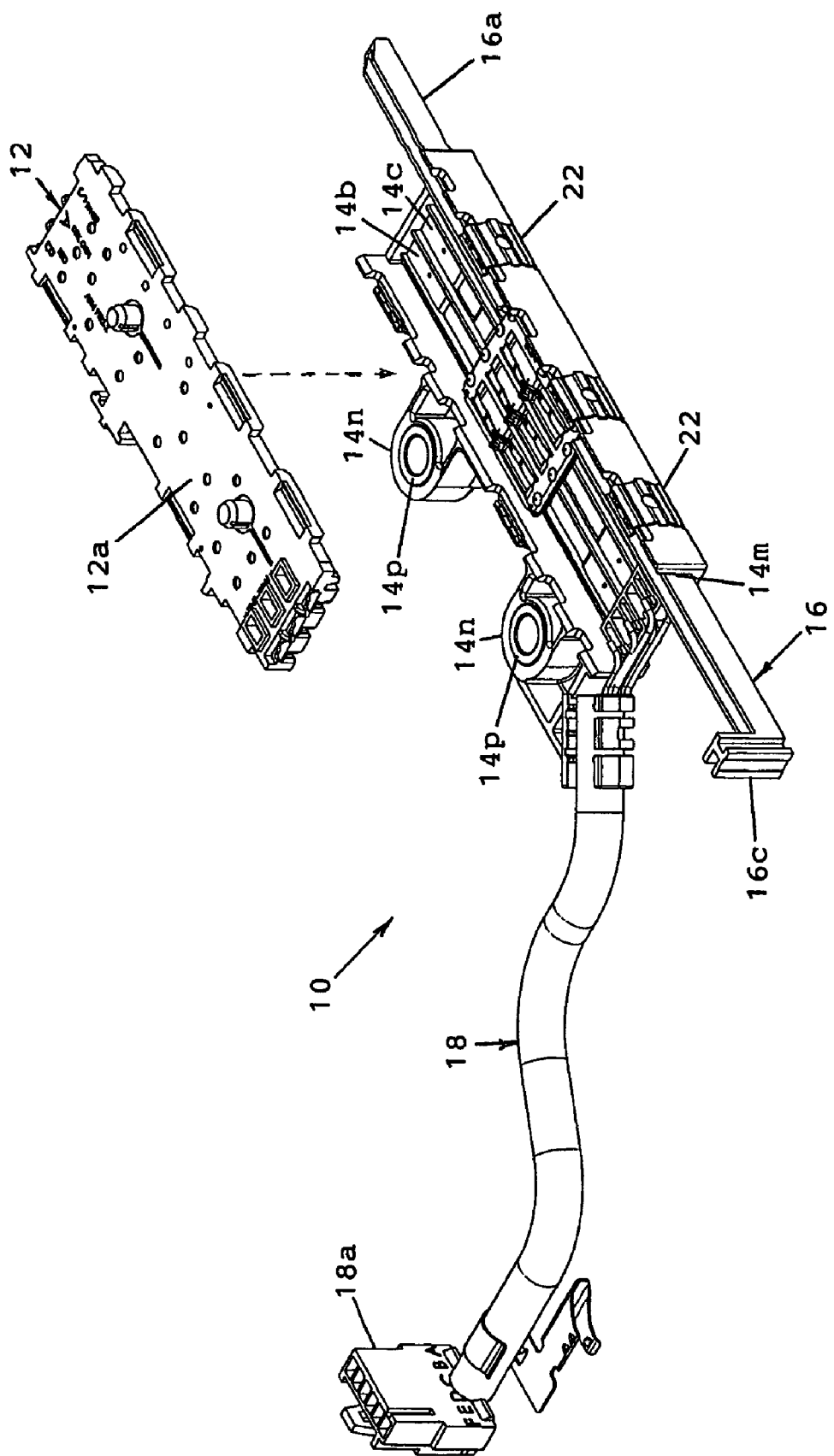
FIG. 2 is a perspective view similar to FIG. 1 but is shown with one of the two housing members separated from and disposed above the other housing member.
Figure 3:
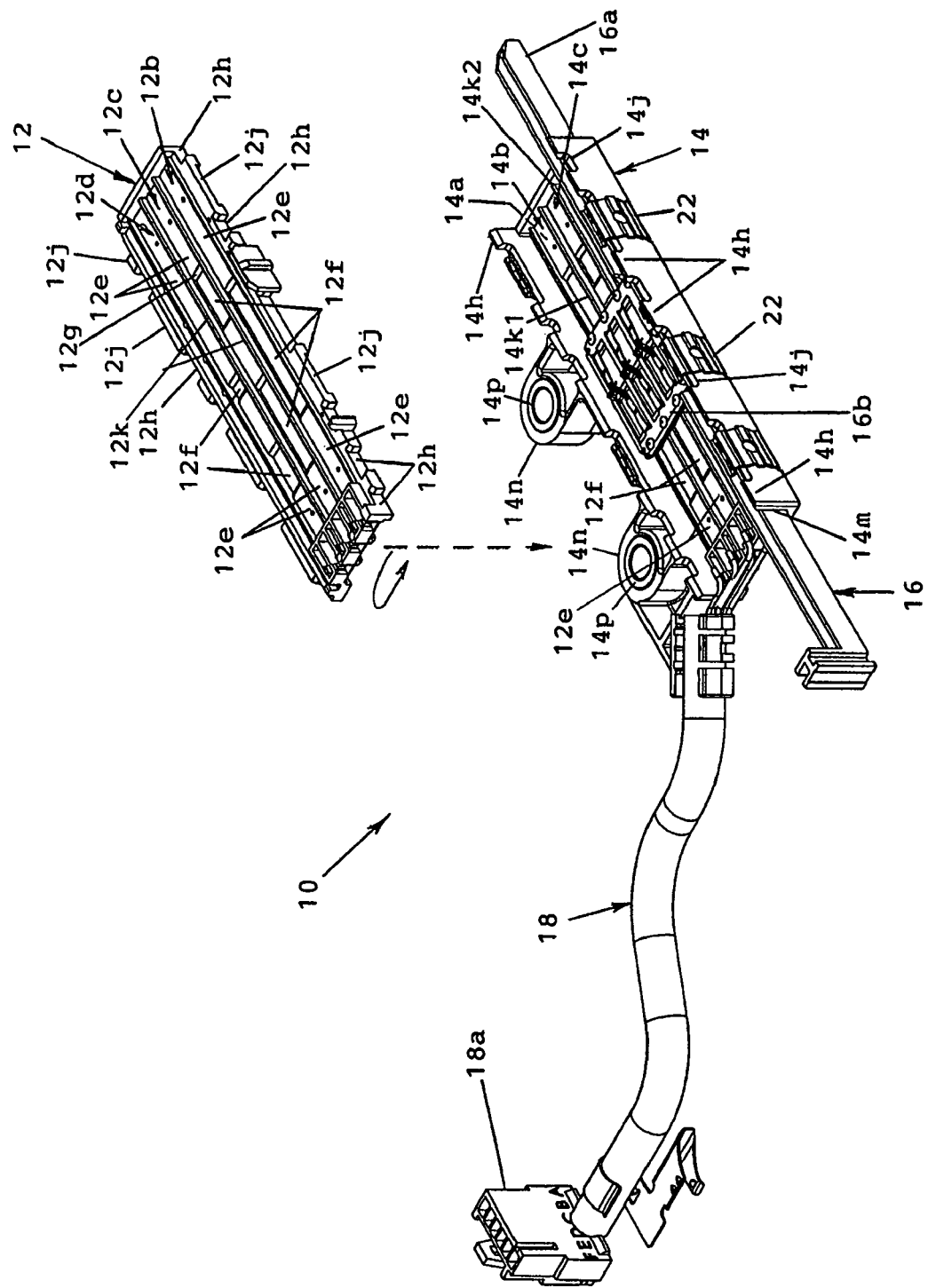
FIG. 3 is a perspective view similar to FIG. 2 but shown with the said one housing member rotated 180 degrees around its longitudinal axis for purposes of illustration.

With particular reference to FIGS. 1-3, numeral 10 is used to indicate an internal mode switch for a vehicular transmission made in accordance with the preferred embodiment of the invention. Switch system 10 comprises a top housing member 12, a bottom housing member 14, an actuator assembly 16 and a wire harness 18.

As best seen in FIG. 2, top housing member 12, formed of suitable electrically insulative material, such as Amodel or Nylon, has a base wall 12a formed with three parallel tracks or strips 12b, 12c 12d (FIG. 3) extending along the length of the housing member. For the purpose of describing the preferred embodiment the material described is Amodel. A respective rib 12k is disposed between adjacent tracks extending along the length of the tracks. Each track has flat surface segments 12e that are provided by the electrically insulative housing material such and other segments 12f that are provided by electrically conductive material comprising exposed portions of a lead frame that is insert molded in housing member 12, to be discussed below. An angled ramp 12g of the electrically insulative plastic material is formed on opposite ends of each electrically conductive segment 12f to facilitate sliding motion of a switching contact member to be discussed. A plurality of notches 12h are formed on opposite side edges along the length of housing member 12 for interfitting with extended tab portion 14h of housing 14 upon assembly of housing members 12 and 14, to be discussed. Notches 12h result in the formation of a plurality of extended tab portions 12j that are received in respective notches 14j of housing member 14 upon assembly.

Housing member 14, preferably formed of the same material as housing 12, has a base wall that is also formed with three parallel, straight tracks or strips two of which, 14b, 14c, are shown, and a third track not seen in FIGS. 2, 3 due to actuator assembly 16, extending along the length of housing member 14. Tracks 14b, 14c and the track not shown, also comprise flat electrically insulative surface segments 12e and flat electrically conductive segments 12f with electrically insulative ramps 12g at either end of each conductive track segment. The conductive track segments are formed by another lead frame that is insert molded in housing 14 in the same manner as the lead frame in housing 12. The tracks in housing 14 are also provided with a respective rib member extending along the length of the housing member between respective tracks. Housing member 14 is also provided with a channel 14m that extends the full length of housing 14 adjacent to and on one side of the plurality of tracks and receives actuator assembly therein, to be discussed.

Figure 4:
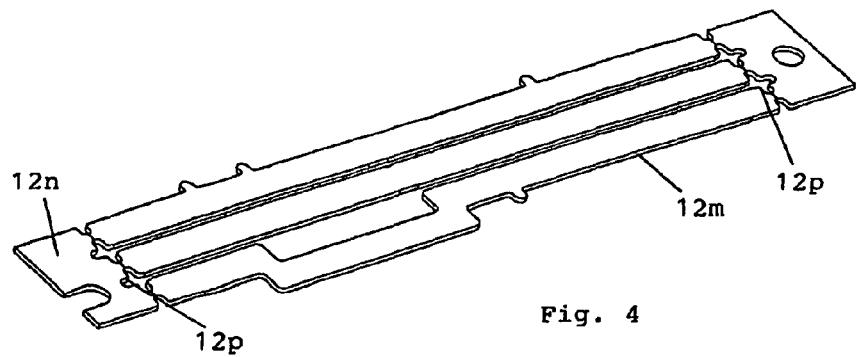
FIG. 4 is a perspective view of a lead frame used in the FIGS. 1-3 switch system.
Figure 5:
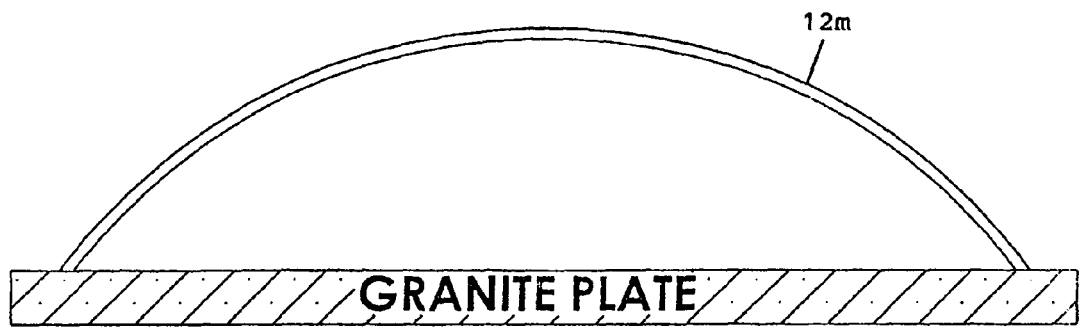
FIG. 5 is a front elevational schematic view showing camber measurement of a lead frame after it as been bent into a curved configuration prior to insert molding.

With reference to FIGS. 4 and 5, a lead frame 12m is insert molded in each housing member and each lead frame is formed with three generally parallel strips or bars that will serve as conductive portions for each track in a respective housing member. As shown in FIG. 4, the three strips extend between handling end pieces 12n that are separated from the strips by break-off holes 12p. Prior to insert molding, the lead frames are bent into a section of a circular configuration having a selected spacing at its center relative to a flat surface supporting the frames, as seen in FIG. 5. In the described preferred embodiment the lead frame has a longitudinal length of approximately 120 mm and a thickness of 0.82+/−0.05 mm.

Stainless steel is used for the lead frames and in order to lower the contact resistance between the lead frames and the spring contact arms and minimize the production of severely oxidized wear particles the lead frames are plated with bright nickel. This is particularly advantageous in the preferred embodiment described herein in which the lead frames form conductive tracks in both the top and bottom housings and debris can collect on the lower tracks and cause changes in switching distances. A nickel flash is first deposited followed by a sulfamate electrolytic bath (Rohm and Haas Electronic Materials Sulfamate Concentrate) with 1.25%+/−0.75% Nikal PC-3 additive (Rohm and Haas Electronic Materials. A layer of approximately 100 to 300 microinches is deposited to provide sufficient hardness for extended wear resistance and lower contact resistance while still permitting the lead frames to be cambered. The camber flattens out somewhat during the molding process to provide a differential gap that varies from 0 at the extremities to a maximum of 6.8+0.25/−0.30 mm at the center of the housing members between the top and bottom housing ribs when all the ribs are formed having the same height. As will be discussed in greater detail below, according to a preferred feature of the invention, one rib is formed with a height extended an extra 0.15 mm so that in a switch made having that feature the maximum gap is 6.65+0.25/−0.30 mm.

Figure 6:
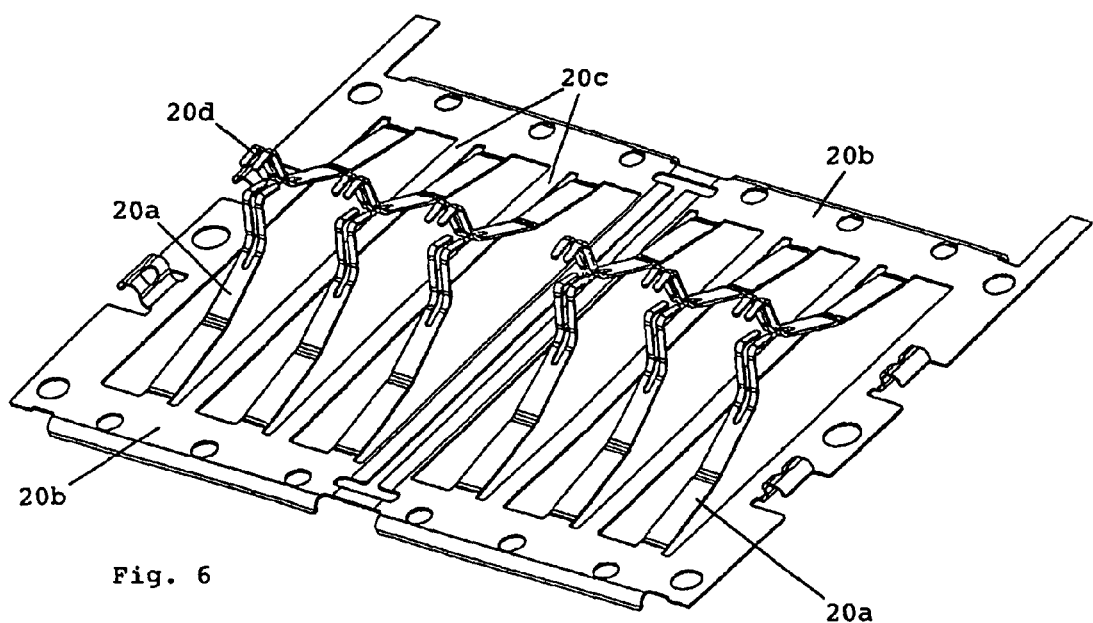
FIG. 6 is a perspective view of a sheet of electrically conductive material that has been formed with cantilever leaf spring arms.
Figure 7:
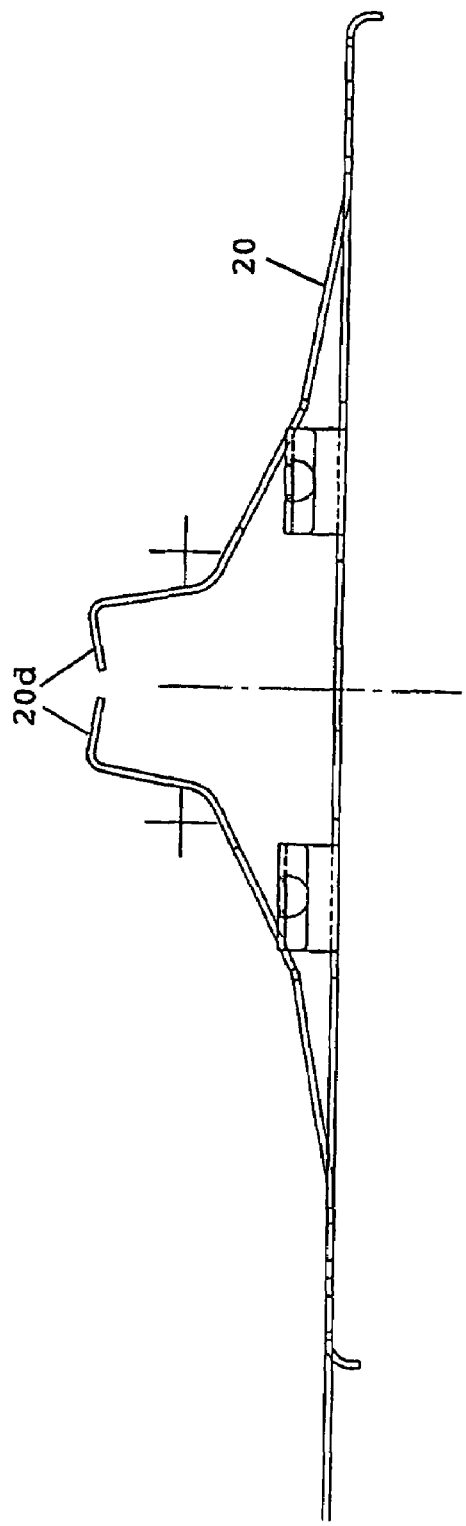
FIG. 7 is a front elevational view of the FIG. 6 sheet.
Figure 8:
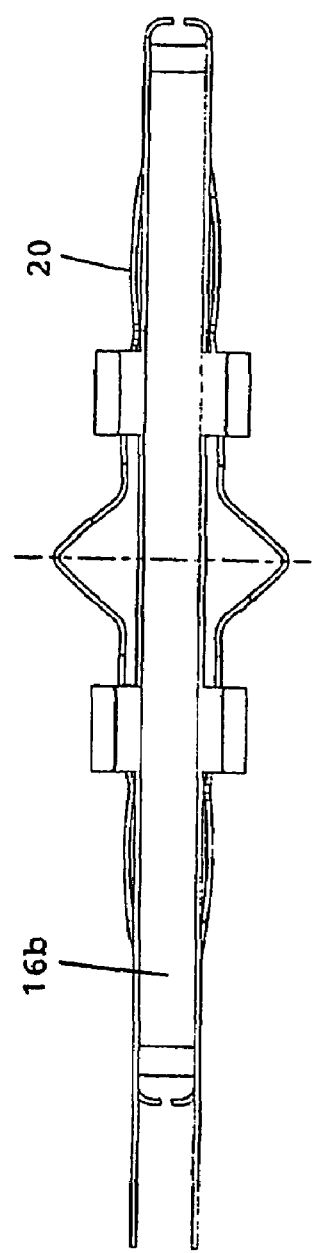
FIG. 8 is a front elevational view of the FIG. 6 sheet wrapped around a paddle.

Actuator assembly 16 comprises an elongated sliding member 16a formed of suitable material, such as Nylon, that is adapted to be received in channel 14m of housing 14. A transversely extending paddle 16b extends from elongated member 16a. A sheet 20 of suitable electrically conductive material, such as stainless steel (see FIG. 6) is stamped into a plurality of cantilever spring leaf arms 20a and wrapped around the paddle. The contact arms extend in pairs from opposed base sides 20b with each pair separated by strips 20c. Contact arms 20a extend away from strips 20c to a free end 20d. In systems made in accordance with the invention the stainless steel is 0.010 mm thick and each arm as a free end that formed to be 9.0-9.75 mm spaced from the plane in which strips 20c lie. A force is applied to each free end moving the free end to 2 mm from the said plane and then released with the cycle repeated at least once and preferably twice to stabilize the spring arms resulting free ends disposed approximately 7.0-7.5 mm from the said plane. The formed sheet is wrapped around opposed face surfaces of paddle 16b with base strips 20b attached to the paddle, as by riveting thereto. The free end of the contact arms are preferably formed with bifurcated end portions to provide redundant contact areas. Actuator sliding member 16a is provided with a coupling portion 16c for coupling to a linkage mechanism connecting the system to the vehicle transmission.

A selected space or gap is provided between corresponding ribs of housing members 12 and 14 to allow paddle 16b of the actuator assembly 16 to slide back and forth along the several tracks. In the preferred embodiment there are three separate tracks in each housing member. In housing member 12 two identical ribs 12k separate tracks 12b from 12c and 12c from 12d. In housing member 14 rib 14k1 separates tracks 14b and 14c and rib 14k2 separates tracks 14c and 14d (hidden). In order to make the switching system less sensitive to vibration, the rotational movement of paddle 16b along the longitudinal axis of sliding member 16a is limited by providing a slightly greater height to the rib of bottom housing member 14 furthest from channel 14m in which the actuator slide member 16a is received, that is rib 14k1. The differential between the extended height rib and the normal rib is approximately 0.15 mm. The closer rib, 14k2 has a height of 2.65 mm from the conductive track while the furthest rib has a height of 2.80 mm. The location of the top surface of the ribs is measured from a datum on the mating surfaces of the housings, i.e., the bottom surface of notches 14j. When Amodel is used for the housing member the camber for the top housing 12 is 0.150-0.168 inches and for bottom housing 14 the camber is 0.405-0.422 inches. The measurement from the datum to rib 14k1 is 4.75+/−0.1 mm. The lead frame camber is 0.670-0.730 inches.

Housing member 14 is provided with a pair of mounting bosses 14n that are bored to receive bushings 14p for mounting the switch system. Wiring harness 18 is provided with a connector 18a and a cable containing six wires that are welded to the lead frame strips. Housing member 12 is received on housing member 14 with actuator sliding member 16a received in channel 14m and tabs 14h of housing member 14 disposed in mating notches 12h of housing member 12 with the housing members held together by stainless steel clips 22.

It should be understood that although the preferred embodiment of the invention has been described to illustrate the invention, the invention includes various modifications and equivalents to the disclosed embodiment. It is intended that the invention include all such modifications and equivalents falling within the scope of the appended claims.

What is claimed:

1. An electrical switch system for use with motor vehicle transmissions having an internal mode switch comprising:
    a first housing member extending along a length having a plurality of tracks extending generally parallel to and along said length, the tracks formed with a base wall having exposed electrically conductive material along selected portions of the tracks, the tracks being separated from one another by respective longitudinally extending ribs formed on the base wall,
    a second housing member having a plurality of tracks extending along said length generally matching the tracks of the first housing member, the tracks of the second housing member formed with a base wall having exposed electrically conductive material along selected portions of the tracks, the tracks of the second housing member being separated from one another by respective longitudinally extending ribs formed on the base wall,
    an elongated actuator having a transversely extending paddle and having coupling portion for coupling to motor vehicle transmissions, the paddle extending across the several tracks, the elongated actuator being slidably received between the housing members, the paddle mounting an electrical spring contact aligned with each track and engageable therewith,
    the second housing member disposed over the first housing member with the ribs of the first and second housing members spaced apart from the ribs of the second housing member to form a selected gap,
    the actuator being received between the ribs of the first and second housing members and being slidable in opposite directions parallel to the direction in which the tracks extend,
    the first and second housing members each formed with a sight camber so that there is a larger gap intermediate to the extremities of the length than at the extremities of the length.

2. An electrical switch system according to claim 1 in which the plurality of tracks in each housing member comprises three tracks.

3. An electrical switch according to claim 1 further comprising a longitudinally extending, actuator receiving, channel formed in one housing member adjacent to a side of the plurality of tracks and the rib in the said one housing member that is furthest from the channel is formed with a greater height from the base wall than any other rib whereby rotational movement of the paddle is limited.

4. An electrical switch system according to claim 3 in which the housing member is formed of electrically insulative material and the gap varies along the length by approximately 0 to a maximum of approximately 6.65 mm+0.25/−0.30 between respective top and bottom housing ribs.

5. An electrical switch system according to claim 1 in which the conductive material in the tracks of each housing member are formed by an electrically conductive lead frame having elongated strips insert molded in electrically insulative material and formed so that there are predetermined portions of each track in which respective strips are exposed.

6. An electrical switch system according to claim 5 in which the lead frames are made of stainless steel plated with bright nickel to provide a highly electrical conductive and wear resistant surface.

7. An electrical switch system according to claim 6 in which the bright nickel plating has a concentration of Nikal PC-3 of 1.25% +/−0.75% brightener.

8. An electrical switch system according to claim 7 in which the thickness of the bright nickel plating is between approximately 100 and 300 microinches.

9. An electrical switch system for use with motor vehicle transmissions having an internal mode switch comprising:
    a first housing member extending along a length having a plurality of tracks extending generally parallel to and along said length, the tracks formed with a base wall having exposed electrically conductive material along selected portions of the tracks, the tracks being separated from one another by respective longitudinally extending ribs formed on the base wall,
    a second housing member having a plurality of tracks extending along said length generally matching the tracks of the first housing member, the tracks of the second housing member formed with a base wall having exposed electrically conductive material along selected portions of the tracks, the tracks of the second housing member being separated from one another by respective longitudinally extending ribs formed on the base wall, one of the first and second housing members having a channel extending along the said length adjacent to a side of the plurality of tracks, an elongated actuator having a transversely extending paddle and having coupling portion for coupling to motor vehicle transmissions, the paddle extending across the several tracks, the elongated actuator being slidably received in the channel, the second housing member disposed over the first housing member with the tracks and ribs of the first housing member aligned with the tracks and ribs of the second housing member and the ribs of the first and second housing members spaced apart from the ribs of the second housing member to form a selected gap, the actuator being received between the ribs of the first and second housing members and being slidable in opposite directions parallel to the direction in which the tracks extend, a sheet of electrically conductive material placed over two opposed face surfaces of the paddle with cantilever spring arms extending away from respective paddle face surfaces and disposed on the paddle for alignment with a respective track of the first and second housing members, the free end of the cantilever arms being movable into and out of electrical engagement with electrically conductive material in the base wall of a respective track in dependence upon the longitudinal position of the actuator, the first and second housing members each formed with a camber so that there is a larger gap intermediate to the extremities of the length than at the extremities of the length.

10. An electrical switch system according to claim 9 in which the plurality of tracks in each housing member comprises three tracks.

11. An electrical switch according to claim 9 in which the rib in the said one housing member that is furthest from the channel is formed with a greater height from the base wall than any other rib whereby rotational movement of the paddle is limited.

12. An electrical switch system according to claim 11 in which the housing member is formed of electrically insulative material and the gap varies along the length from approximately 0 to a maximum of approximately 6.65+0.25/−0.30 mm.

13. An electrical switch system according to claim 9 in which the conductive material in the tracks of each housing member are formed by an electrically conductive lead frame having elongated strips insert molded in electrically insulative material and formed so that there are predetermined portions of each track in which respective strips are exposed.

14. An electrical switch system according to claim 13 in which the lead frames are made of stainless steel plated with bright nickel to provide a highly electrical conductive and wear resistant surface.

15. An electrical switch system according to claim 14 in which the bright nickel plating has a concentration of Nikal PC-3 of 1.25% +/−0.75% brightener.

16. An electrical switch system according to claim 15 in which the thickness of the bright nickel plating is between approximately 100 and 300 microinches.

* * * * *